(12) United States Patent
Zhou et al.

(10) Patent No.: US 9,036,694 B2
(45) Date of Patent: May 19, 2015

(54) ADAPTIVE QAM TRANSMISSION SCHEME TO IMPROVE PERFORMANCE ON AN AWGN CHANNEL

(75) Inventors: Wei Zhou, Beijing (CN); Li Zou, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 522 days.

(21) Appl. No.: 12/737,094

(22) PCT Filed: May 22, 2009

(86) PCT No.: PCT/IB2009/005684
§ 371 (c)(1),
(2), (4) Date: Dec. 8, 2010

(87) PCT Pub. No.: WO2009/150500
PCT Pub. Date: Dec. 17, 2009

(65) Prior Publication Data
US 2011/0090948 A1 Apr. 21, 2011

(30) Foreign Application Priority Data
Jun. 13, 2008 (EP) .................................. 08305257

(51) Int. Cl.
*H04N 11/02* (2006.01)
*G06F 11/00* (2006.01)
(Continued)

(52) U.S. Cl.
CPC .......... *H04L 27/3411* (2013.01); *H04L 1/0003* (2013.01); *H04L 1/0009* (2013.01);
(Continued)

(58) Field of Classification Search
CPC ... H04L 1/0003; H04L 1/0009; H04L 1/0044; H04L 1/005; H04L 27/366; H04L 27/0008; H04L 27/3411; H04L 27/3416; H04L 1/0057

USPC ................... 375/240.01, 260, 261, 298, 332; 714/758
IPC ...................................................... H04N 11/02
See application file for complete search history.

(56) References Cited

U.S. PATENT DOCUMENTS

2003/0031122 A1   2/2003 Kim et al.
2005/0031047 A1*  2/2005 Maltsev et al. ............... 375/260
(Continued)

FOREIGN PATENT DOCUMENTS

CN   1465168   12/2003
JP   1168710   3/1999
(Continued)

OTHER PUBLICATIONS

ETSI, "Digital Video Broadcasting (DVB); Framing Structure, Channel Coding and Modulation for Cable Systems", European Broadcasting Union, EN 300429, V1.2.1, France, Apr. 1998.
(Continued)

*Primary Examiner* — Jay Patel
*Assistant Examiner* — Neil Mikeska
(74) *Attorney, Agent, or Firm* — Robert D. Shedd; Joseph J. Opalach

(57) ABSTRACT

A cable transmitter supports a number of low density parity check (LDPC) coding rates, e.g., ¼, ⅓, ⅖, ½, ⅗, ⅔, ¾, ⅘, ⅚, ⅞ and 9/10; and supports a number of quadrature amplitude modulation (QAM) schemes, e.g., 4-QAM, 16-QAM, 64-QAM, 256-QAM, 1024-QAM or higher. For a selected modulation scheme, the cable transmitter selects between using a non-uniform symbol constellation or a uniform symbol constellation as a function of a selected coding rate.

15 Claims, 6 Drawing Sheets

(51) Int. Cl.
  *H04L 27/34* (2006.01)
  *H04L 1/00* (2006.01)
  *H04L 27/00* (2006.01)
  *H04L 27/36* (2006.01)

(52) U.S. Cl.
  CPC .............. *H04L1/0044* (2013.01); *H04L 1/005* (2013.01); *H04L 1/0057* (2013.01); *H04L 27/0008* (2013.01); *H04L 27/3416* (2013.01); *H04L 27/366* (2013.01)

(56) References Cited

U.S. PATENT DOCUMENTS

| | | | |
|---|---|---|---|
| 2007/0044000 A1* | 2/2007 | Shen et al. | 714/758 |
| 2007/0054624 A1 | 3/2007 | Kashiwagi | |
| 2007/0223374 A1 | 9/2007 | Popovski et al. | |
| 2007/0256001 A1* | 11/2007 | Suzuki et al. | 714/774 |
| 2013/0083862 A1 | 4/2013 | Barsoum et al. | |

FOREIGN PATENT DOCUMENTS

| | | |
|---|---|---|
| JP | 2010538502 | 12/2010 |
| WO | WO03094520 | 11/2003 |
| WO | WO2007029745 | 3/2007 |

OTHER PUBLICATIONS

Sommer et al., "Signal Shaping by Non-Uniform QAM for AWGN Channels and Applications Using Turbo Coding", Dresden University of Technology, Germany.

Zheng et al., "Shaping Gain of LDPC Coded-QAM Transmitting Systems with Non-Uniform Constellation", Jan. 20, 2007.

Zesong et al., "Shaping Gain by Non-Uniform QAM Constellation with Binary Turbo Coded Modulatioin", The 14th IEEE 2003 International Symposium on personal Indoor and Mobile Radio Communication Proceedings, 2003.

Pursley et al., "Adaptive Nonuniform Phase-Shift-Key Modulation for Multimedia Traffic in Wireless Networks", IEEE Journal on Selected Areas in Communications, vol. 18, No. 8, Aug. 2008.

Search Report Dated Sep. 22, 2009.

* cited by examiner

FIG. 3

TABLE ONE

| ±0.039934 | ±0.120127 | ±0.200994 | ±0.283207 |
| --- | --- | --- | --- |
| ±0.067358 | ±0.453957 | ±0.544127 | ±0.0638580 |
| ±0.739052 | ±0.847173 | ±0.965699 | ±1.099117 |
| ±1.254465 | ±1.446126 | ±1.709493 | ±2.196958 |

32 non-uniform PAM

FIG. 5

TABLE TWO

| ±0.0542 | ±0.1625 | ±0.2708 | ±0.3791 |
| ±0.4874 | ±0.5957 | ±0.7040 | ±0.8123 |
| ±0.9206 | ±1.0289 | ±1.1372 | ±1.2455 |
| ±1.3538 | ±1.4621 | ±1.5704 | ±1.6787 |

32 uniform PAM

US 9,036,694 B2

ADAPTIVE QAM TRANSMISSION SCHEME TO IMPROVE PERFORMANCE ON AN AWGN CHANNEL

This application claims the benefit, under 35 U.S.C. §365 of International Application PCT/IB2009/005684, filed May 22, 2009, which was published in accordance with PCT Article 21(2) on Dec. 17, 2009 in English and which claims the benefit of European patent application No. 08305257.1, filed Jun. 13, 2008.

BACKGROUND OF THE INVENTION

The present invention generally relates to communications systems and, more particularly, to a communications systems having a plurality of code rates and modulation schemes.

Digital Video Broadcasting-Cable (DVB-C) is a first generation cable transmission system (e.g., see EN 300 429 V.1.2.1 (1998-04) Digital Video Broadcasting (DVB); Framing structure, channel coding and modulation for cable systems). However, migration to a second generation cable system, DVB-C2, is currently being studied for increasing transport capacity in order to offer new services such as high-definition television (HDTV), Video-on-Demand (VoD), and other advanced personalized and interactive services in the cable environment.

One way of improving performance in a second generation cable system is to adopt for use in DVB-C2 the low density parity check (LDPC) forward error correction codes used in the second generation of Digital Video Broadcast-satellite (DVB-S2) system (e.g., see European Telecommunications Standards Institute (ETSI) Draft EN 302307, v.1.1.1, June 2004). In DVB-S2, it is known that these LDPC codes have good performance in conjunction with quadrature amplitude modulation (QAM) over a range of QAM schemes such as 4-QAM, 16-QAM, 64-QAM, 256-QAM, 1024-QAM, etc. In each of these QAM schemes, uniform symbol (signal point) constellations are used in DVB-S2 for all LDPC coding rates. Indeed, uniform symbol constellations are even used for DVB-C, DVB-S, and even next generation systems such as DVB-Terrestrial 2 (T2).

SUMMARY OF THE INVENTION

We have studied the cable broadcasting transmission environment and find that the AWGN channel is the main transmission environment. As such, and in accordance with the principles of the invention, we have observed that it is possible to get better coding gains and increase the capacity of a cable system by adapting a symbol constellation as a function of coding rate to be either a non-uniform symbol constellation or a uniform symbol constellation.

In an illustrative embodiment of the invention, a cable transmitter supports a number of LDPC coding rates, e.g., 1/4, 1/3, 2/5, 1/2, 3/5, 2/3, 3/4, 4/5, 5/6, 8/9 and 9/10; and supports a number of QAM schemes, e.g., 4-QAM, 16-QAM, 64-QAM, 256-QAM, 1024-QAM or higher. For a selected modulation scheme, the cable transmitter selects between using a non-uniform symbol constellation or a uniform symbol constellation as a function of a selected coding rate. For example, for a 1024-QAM scheme, the cable transmitter uses a uniform 1024 symbol constellation when the coding rate is greater than, or equal to, 8/9; while the cable transmitter uses a non-uniform 1024 symbol constellation when the coding rate is less than 8/9.

In another illustrative embodiment of the invention, a cable receiver supports a number of LDPC coding rates, e.g., 1/4, 1/3, 2/5, 1/2, 3/5, 2/3, 3/4, 4/5, 5/6, 8/9 and 9/10; and supports demodulation of a number of QAM schemes, e.g., 4-QAM, 16-QAM, 64-QAM, 256-QAM, 1024-QAM or higher. For a selected modulation scheme, the cable receiver selects between using a non-uniform symbol constellation or a uniform symbol constellation as a function of a selected coding rate. For example, for a 1024-QAM scheme, the cable receiver uses a uniform 1024 symbol constellation when the coding rate is greater than, or equal to, 8/9; while the cable receiver uses a non-uniform 1024 symbol constellation when the coding rate is less than 8/9.

In view of the above, and as will be apparent from reading the detailed description, other embodiments and features are also possible and fall within the principles of the invention.

BRIEF DESCRIPTION OF THE DRAWINGS

FIG. 3 illustrates Table One for a 32 non-uniform PAM symbol constellation;

FIG. 5 illustrates Table Two for a 32 uniform PAM symbol constellation; and

DETAILED DESCRIPTION

Figure 1:
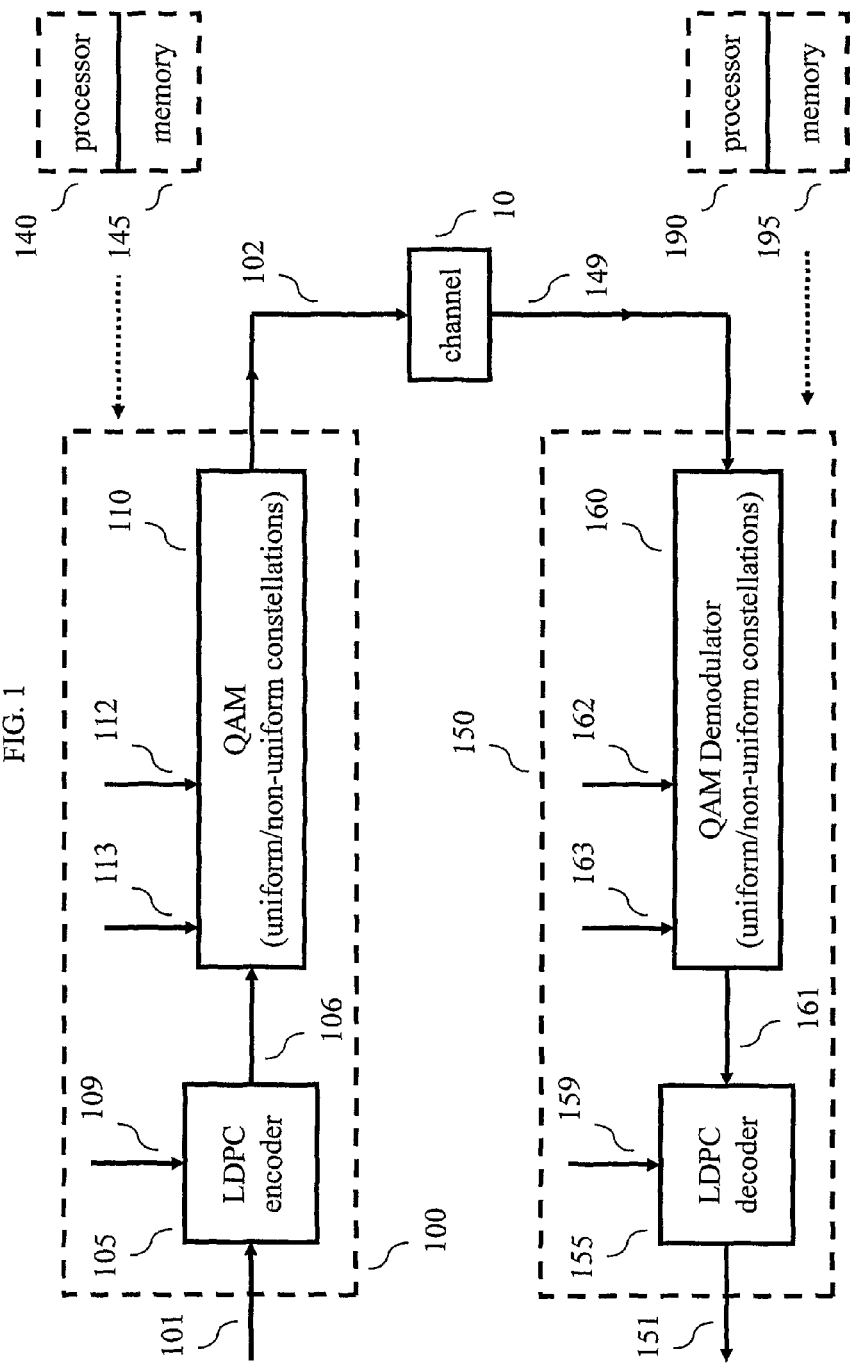
FIG. 1 shows an illustrative high-level block diagram of a system embodying the principles of the invention.

Other than the inventive concept, the elements shown in the figures are well known and will not be described in detail. For example, other than the inventive concept, familiarity with Discrete Multitone (DMT) transmission (also referred to as Orthogonal Frequency Division Multiplexing (OFDM) or Coded Orthogonal Frequency Division Multiplexing (COFDM)) is assumed and not described herein. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire), ATSC (Advanced Television Systems Committee) (ATSC), Digital Video Broadcasting (DVB), Digital Video Broadcasting-Terrestrial (DVB-T) (e.g., see ETSI EN 300 744 V1.4.1 (2001-01), *Digital Video Broadcasting (DVB); Framing structure, channel coding and modulation for digital terrestrial television*; Digital Video Broadcasting-Cable (DVB-C) (e.g., see EN 300 429 V.1.2.1 (1998-04) *Digital Video Broadcasting (DVB); Framing structure, channel coding and modulation for cable systems*); Digital Video Broadcast-satellite (DVB-S2) system (e.g., see European Telecommunications Standards Institute (ETSI) Draft EN 302307, v.1.1.1, June 2004); and the Chinese Digital Television System (GB) 20600-2006 (Digital Multimedia Broadcasting—Terrestrial/Handheld (DMB-T/H)) is assumed. Likewise, other than the inventive concept, other transmission concepts such as eight-level vestigial sideband (8-VSB), Phase-Shift Keying (PSK), Quadrature Amplitude Modulation (QAM), and receiver components such as a radio-frequency (RF) front-end, or receiver section, such as a low noise block, tuners, and down converters; along with fast fourier transform (FFT) elements, spectrum shifters, channel state information (CSI) estimators, equalizers, demodulators, correlators, leak integrators and squarers is assumed. Further, other than the inventive concept, familiarity with processing signals, such as forming channel state information, is assumed and not described herein. Similarly, other than the inventive concept, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. In this regard, the embodiments described herein may be implemented in the analog or digital domains. Finally, like-numbers on the figures represent similar elements.

As noted earlier, in a second generation system such as DVB-S2, or even DVB-T2, uniform symbol constellations are used for all LDPC coding rates. However, how to effectively combine LDPC codes with a modulation technique to get maximum coding gain and shaping gain is still a useful issue. From information theory it is known that, in addition to coding gain, shaping gain can be obtained if the amplitude of the transmitter output follows a Gaussian distribution in an additive white Gaussian noise (AWGN) channel. There are two methods to get shaping gains.

One method is to use a uniform QAM constellation together with different probabilities for selecting each symbol (signal point) to provide shaping gain. This type of approach includes trellis shaping, the use of prefix codes, or a similar, subdivision of the signal constellation into variable-size regions. But this method needs one extra shaping code element in the transmitter design, which leads to some increase in transmitter complexity.

The second method is to use a non-uniform symbol constellation in order to obtain shaping gain, i.e., geometrical shaping. Here, each symbol of the constellation is assumed to be chosen with the same probability and the symbols are arranged in a way that a Gaussian distribution of the output signal at the transmitter results, e.g., more symbols are used at the lower power levels and less symbols are used at the higher power levels. This method does not require an extra shaping code element in the transmitter.

Unfortunately, one reason the above-noted standards use uniform symbol constellations is because of a number of disadvantages in using non-uniform symbol constellations. Firstly, shaping gains usually increase with the increase of the order of the QAM constellation, e.g., for 1024-QAM, the shaping gain is about 0.7 dB, for 256-QAM, the shaping gain is about 0.5 dB, but for low order QAM, the shaping gains are very little. So there is no significant gain in using a non-uniform symbol constellation in a low order QAM scheme such as QPSK, or 16-QAM. In addition, shaping gains usually decrease with an increase in code rate. In fact, for a very high code rate, the shaping gain may even become negative. Finally, another disadvantage is that a non-uniform symbol constellation is not good in a fading channel environment.

We have studied the cable broadcasting transmission environment and find that the AWGN channel is the main transmission environment. As such, and in accordance with the principles of the invention, we have observed that it is possible to get better coding gains and increase the capacity of a cable system by adapting a symbol constellation as a function of coding rate to be either a non-uniform symbol constellation or a uniform symbol constellation.

Referring now to FIG. 1, a high-level block diagram of a system in accordance with the principles of the invention is shown comprising a transmitter 100 and a receiver 150. Only those portions relevant to the inventive concept are shown in transmitter 100 and receiver 150. Transmitter 100 transmits (or broadcasts) a signal 102 over a communications channel 10 to receiver 150. Illustratively, it is assumed that channel 10 represents an AWGN channel such as represented by a cable system, though the inventive concept is not so limited and may be applicable to wire or wireless communications systems. Since communications channel 10 affects the transmitted signal, e.g., noise, etc., this results in a signal 149 being received by receiver 150.

Illustratively, transmitter 100 supports a number of LDPC coding rates, e.g., $1/4$, $1/3$, $2/5$, $1/2$, $3/5$, $2/3$, $3/4$, $4/5$, $5/6$, $8/9$ and $9/10$. For example, and as known in the art, a coding rate of $2/5$ means that for every two bits applied to the LDPC encoder, five output bits are generated by the LDPC encoder, e.g., three parity bits have been added. Further, as defined herein, a coding rate of $1/4$ is the smallest coding rate and a coding rate of $9/10$ is the highest coding rate. Thus, a coding rate of $1/2$ is less than a coding rate of $5/6$. These LDPC coding rates are described for example in the above-noted DVB-S2 system and now applied to a cable system. Transmitter 100 also supports a number of m-QAM schemes, e.g., 4-QAM, 16-QAM, 64-QAM, 256-QAM, 1024-QAM, where the parameter m represents the order, or size, of the symbol constellation and is an integer greater than one. In accordance with the principles of the invention, transmitter 100 selects between using a non-uniform m-symbol constellation and a uniform m-symbol constellation as a function of a coding rate.

Transmitter 100 comprises LDPC encoder 105 (representative of a forward error correction encoder), and QAM modulator 110. Transmitter 100 is a processor-based system and includes one, or more, processors and associated memory as represented by processor 140 and memory 145 shown in the form of dashed boxes in FIG. 1. In this context, computer programs, or software, are stored in memory 145 for execution by processor 140 and, e.g., implement LDPC encoder 105. Processor 140 is representative of one, or more, stored-program control processors and these do not have to be dedicated to the transmitter function, e.g., processor 140 may also control other functions of transmitter 100. Memory 145 is representative of any storage device, e.g., random-access memory (RAM), read-only memory (ROM), etc.; may be internal and/or external to transmitter 100; and is volatile and/or non-volatile as necessary.

In a complementary fashion, receiver 150 supports the same number of LDPC coding rates, e.g., $1/4$, $1/3$, $2/5$, $1/2$, $3/5$, $2/3$, $3/4$, $4/5$, $5/6$, $8/9$ and $9/10$; and the same number of m-QAM schemes, e.g., 4-QAM, 16-QAM, 64-QAM, 256-QAM, 1024-QAM, for recovering the original data. In accordance with the principles of the invention, receiver 150 selects between using a non-uniform m-symbol constellation and a uniform m-symbol constellation as a function of a coding rate.

Receiver 150 comprises QAM demodulator 160 and LDPC decoder 155 (representative of a forward error correction decoder). Like transmitter 100, receiver 150 is also a processor-based system and includes one, or more, processors and associated memory as represented by processor 190 and memory 195 shown in the form of dashed boxes in FIG. 1. In this context, computer programs, or software, are stored in memory 195 for execution by processor 190 and, e.g., implement LDPC decoder 155. Processor 190 is representative of one, or more, stored-program control processors and these do not have to be dedicated to the receiver function, e.g., processor 190 may also control other functions of receiver 150. Memory 195 is representative of any storage device, e.g., random-access memory (RAM), read-only memory (ROM), etc.; may be internal and/or external to receiver 150; and is volatile and/or non-volatile as necessary.

It should be noted that, other than the inventive concept, the illustrative system shown in FIG. 1 functions in accordance with DVB as defined in the above-noted standards and other DVB standards. For example, a DVB transmission system transmits frames of data. In this regard, a DVB transmission system uses transmission parameter signaling (TPS) so that a transmitter can provide signaling parameters, e.g., coding rate and modulation scheme, for each transmitted frame to a receiver (e.g., see ETSI EN 300 744 V1.5.1 (2004-11), Digital Video Broadcasting (DVB); Framing structure, channel coding and modulation for digital terrestrial television). For the purposes of this example, it is assumed that transmitter 100 uses TPS as defined in DVB for providing signaling parameters to receiver 150. The values specified in the TPS, e.g., coding rate and modulation scheme can change from frame to frame. In addition, how a coding rate is selected and how a symbol constellation size is selected are irrelevant to the inventive concept and performed in accordance with DVB. As such, in DVB, the service that is transmitted in a channel determines the code rate and m-QAM scheme to be used, or selected. For a given channel (e.g., frequency band), the code rate and size of the symbol constellation determine the throughput of the system. For example, if an HDTV service is transmitted on a channel, a high code rate and a large symbol constellation will be preferable. Likewise, if a single standard definition TV (SDTV) service is being transmitted on a channel, then a low code rate and a smaller symbol constellation will suffice. However, if a number of SDTV services are being transmitted on a channel, then, again, a high code rate and a large symbol constellation will be preferable.

Returning to transmitter 100, data, as represented by input signal 101 is applied to LDPC encoder 105, which encodes the data in accordance with a selected one of the above-noted coding rates as defined in the above-noted DVB-S2 standard to provide coded data 106 to QAM modulator 110. LDPC encoder 105 is set to the selected coding rate via signal 109, which, e.g., is provided by processor 140. Likewise, the selected m-QAM scheme for QAM modulator 110 to use is provided via signal 113, which, e.g., is provided by processor 140. However, and in accordance with the principles of the invention, QAM modulator 110 is also set to use either a non-uniform symbol constellation or a uniform symbol constellation via signal 112, which, e.g., is provided by processor 140. QAM modulator 110 uses the selected m-QAM scheme and constellation type (uniform or non-uniform) for providing a corresponding QAM modulated signal for transmission via signal 102.

Figure 2:
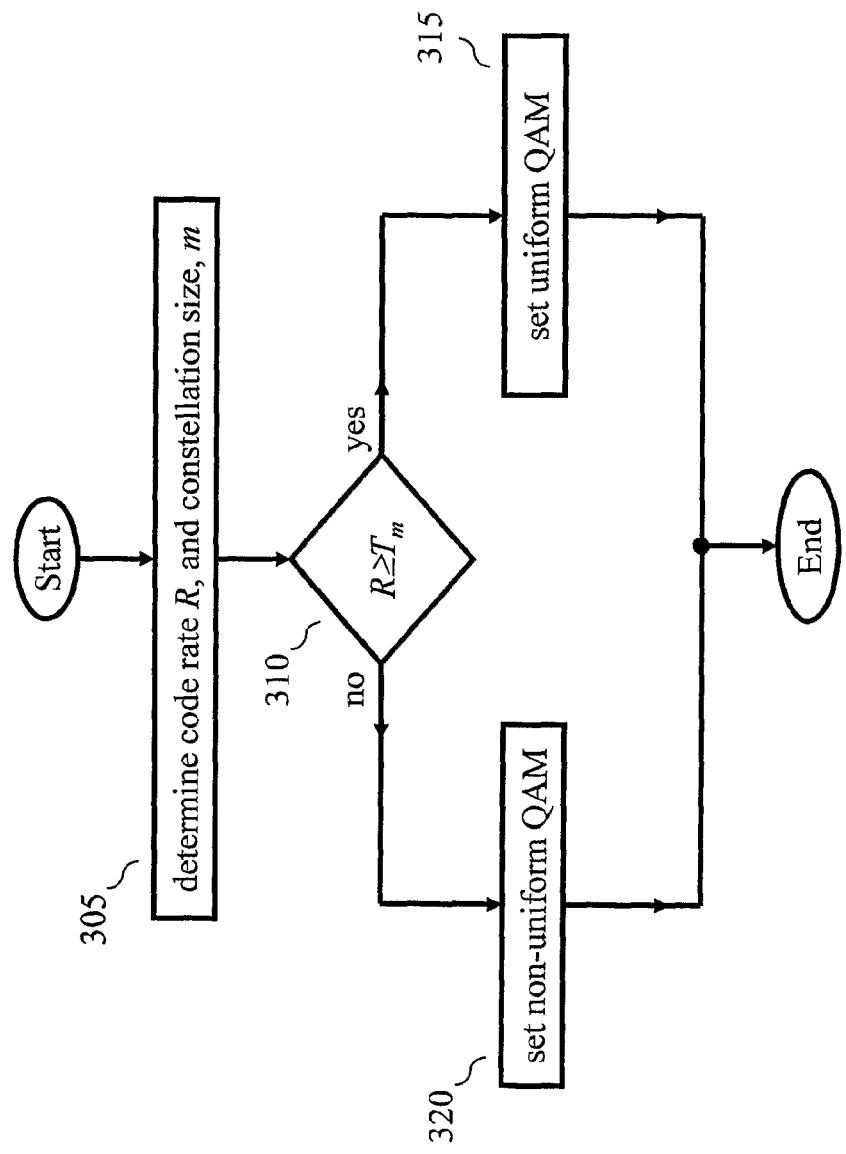
FIG. 2 shows an illustrative flow chart in accordance with the principles of the invention for use in either the transmitter or receiver of FIG. 1.

Referring now to FIG. 2, an illustrative flow chart in accordance with the principles of the invention for use in transmitter 100 is shown. In step 305, processor 140 determines (or selects) a coding rate for use by LDPC encoder 109 (which is set via signal 109) and an m-QAM scheme for use by QAM modulator 110 (which is set via signal 113). In step 310, processor 140 compares the selected coding rate, R, to a threshold value, $T_m$. If the selected coding rate, R, is greater than, or equal to, the threshold value, $T_m$, then processor 140 sets QAM modulator 110 to use a uniform symbol constellation in step 315, via signal 112. However, if the selected coding rate, R, is less than the threshold value, $T_m$, then processor 140 sets QAM modulator 110 to use a non-uniform symbol constellation in step 320, via signal 112.

Illustratively, if a 256-QAM scheme is selected (m=256), then $T_{256}=8/9$. Thus, and in accordance with the principles of the invention, for coding rates of ¼, ⅓, ⅖, ½, ⅗, ⅔, ¾, ⅘ and ⅚, a non-uniform 256 symbol constellation is used; while for coding rates of ⅞ and ⁹⁄₁₀, a uniform 256 symbol constellation is used. As further illustration, if a 1024-QAM scheme is selected (m=1024), then $T_{1024}=8/9$. Thus, and in accordance with the principles of the invention, for coding rates of ¼, ⅓, ⅖, ½, ⅗, ⅔, ¾, ⅘ and ⅚, a non-uniform 1024 symbol constellation is used; while for coding rates of ⅞ and ⁹⁄₁₀, a uniform 1024 symbol constellation is used. Other $T_m$ threshold values for the remaining m-QAM schemes can be determined experimentally. As can be observed from the two examples given above for 256-QAM and 1024-QAM it may be the case, but it is not required, that all $T_m$ values be the same.

Figure 4:
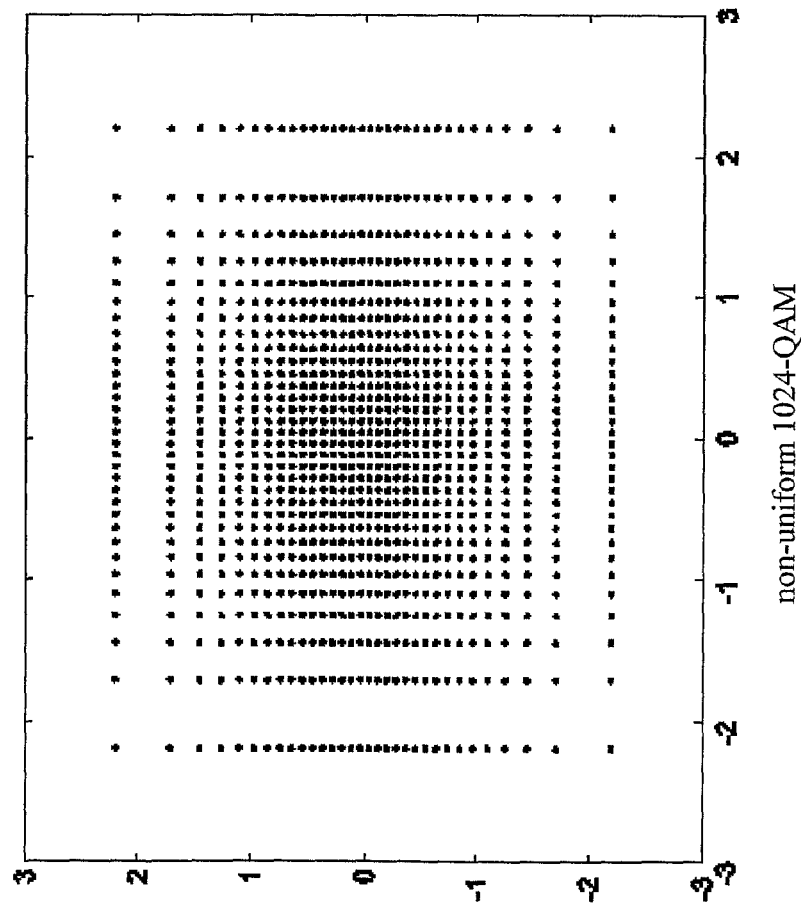
FIG. 4 illustrates a non-uniform 1024-QAM symbol constellation using the values of Table One.

It should be noted that the various different symbol constellations used by QAM modulator 110 are stored in a memory, e.g., memory 145. Thus, and in accordance with the principles of the invention, QAM modulator 110 in effect adapts the symbol constellation. This adaptive constellation design is easy to implement and does not need significant additional cost, which can make all code rates achieve better performance over an AWGN channel. For a non-uniform symbol constellation, the coordinates of each constellation symbol are arranged in the way such that a Gaussian distribution of the output constellation signal at the transmitter results. For a uniform symbol constellation, the coordinates of each constellation symbol are arranged uniformly in the signal space. In this regard, illustrative tables for a 1024-QAM scheme are shown in FIGS. 3 and 4 for both a non-uniform constellation and a uniform constellation.

As known in the art, a 1024-QAM scheme can be represented as the intersecting points of two 32-PAM (Pulse Amplitude Modulation) constellations, one along the in-phase (I) axis and the other along the quadrature phase (Q) axis. Table One of FIG. 3 provides the normalized signal points for 32 symbols of a non-uniform PAM constellation (again, these points occur in both the I axis and the Q axis). It should be noted that Table One in effect contains 32 entries, via the use of the "±" sign. As such, Table One represents a non-uniform 1024-QAM constellation, which is illustratively shown in FIG. 4. As known in the art, a normalized symbol constellation just means the average energy of each symbol is 1. For purposes of comparing different symbol constellations, it is preferable to normalize the constellations. For example, consider a 4-PAM constellation having symbols located at the following coordinates along an axis: −3, −1, 1, 3. After normalization, the normalized constellation becomes: −1.3416, −0.4472, +0.4472, +1.3416, where the average energy of each symbol is normalized to 1 (e.g., see "Signal Shaping by QAM for AWGN Channels and Applications Using Turbo Coding", Dirk Sommer, Gerhard P. Fettweis. ITG Conference Source and Channel Coding, pages 81-86, January 2000).

Figure 6:
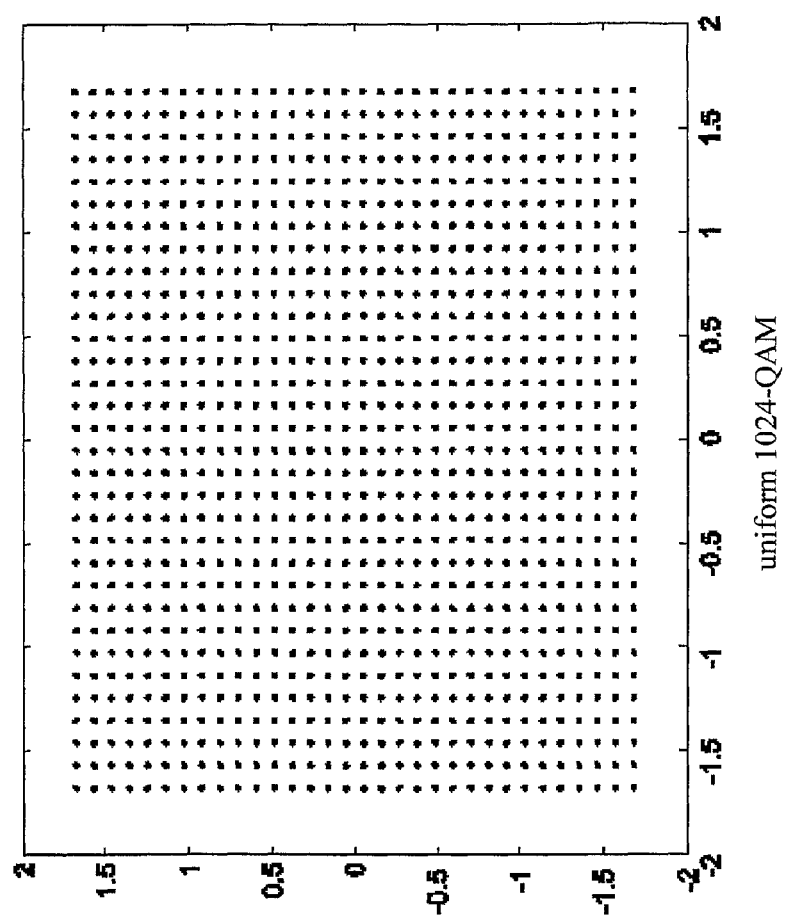
FIG. 6 illustrates a uniform 1024-QAM symbol constellation using the values of Table Two.

Likewise, Table Two of FIG. 5 provides the normalized signal points for 32 symbols of a uniform PAM constellation (again, these points occur in both the I axis and the Q axis). It should again be noted that Table Two in effect contains 32 entries, via the use of the "±" sign. As such, Table Two represents a uniform 1024-QAM constellation, which is illustratively shown in FIG. 6.

Turning back now to FIG. 1, receiver 150 performs in a complementary fashion to transmitter 100 and, as such, only an overview is provided. Receiver 150 determines the selected m-QAM scheme and code rate for a received frame via the above-noted TPS signaling. As such, LDPC decoder 155 is set to the selected coding rate via signal 159, e.g., from processor 190; and QAM demodulator 160 is set to the selected m-QAM modulation via signal 163, e.g., from processor 190. In addition, processor 190 executes, e.g., the above-described flow chart of FIG. 2, to determine whether a non-uniform constellation or a uniform constellation is used by QAM demodulator 190. In step 305, and as already noted, processor 190 determines (or selects) a coding rate for use by LDPC decoder 155 (which is set via signal 159) and an m-QAM scheme for use by QAM demodulator 160 (which is set via signal 163) upon receipt of the TPS signaling. In step 310, processor 190 compares the selected coding rate, R, to a threshold value, $T_m$. If the selected coding rate, R, is greater than, or equal to, the threshold value, $T_m$, then processor 190 sets QAM demodulator 160 to use a uniform symbol constellation in step 315, via signal 162. However, if the selected coding rate, R, is less than the threshold value, $T_m$, then processor 190 sets QAM demodulator 160 to use a non-uniform symbol constellation in step 320, via signal 162. QAM demodulator 160 demodulates the received signal 149 and provides demodulated encoded data to LDPC decoder 155, which provides error corrected data 151. As described above, for a 1024-QAM symbol constellation, $T_m=8/9$ and Table One of FIG. 3 and Table Two of FIG. 5 can be stored in a memory, e.g., memory 195, so that QAM demodulator 160 adapts the symbol constellations as required. It should be noted that instead of performing the flow chart of FIG. 3, receiver 150 can recover information associated with using a uniform symbol constellation or non-uniform symbol constellation from suitably modified TPS signaling.

As described above, and in accordance with the principles of the invention, a non-uniform symbol constellation or a uniform symbol constellation for a given m-QAM scheme can be selected as a function of coding rate. This adaptive constellation design is easy to implement and does not need significant additional cost, which can make all code rates achieve better performance over an AWGN channel. Although the inventive concept was described in the context of LDPC coding, the inventive concept is not so limited and is applicable to other channel coding schemes. Similarly, although described in the context of a cable system, the inventive concept is also applicable to other communications systems, whether they are AWGN-like or not.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements (e.g., of FIG. 1) may be implemented in a stored-program-controlled processor, e.g., a digital signal processor, which executes associated software. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. A method comprising:
   adapting a symbol constellation as a function of an error correction coding rate to be either a non-uniform symbol constellation or a uniform symbol constellation, including:
      comparing the error correction coding rate to a threshold value, where the threshold value is associated with a selected QAM modulation scheme, the QAM modulation scheme having an associated symbol constellation;
      adapting the associated symbol constellation to be non-uniform if the error correction coding rate is greater than, or equal, to the threshold value; and
      otherwise adapting the associated symbol constellation to be uniform if the error correction coding rate is less than the threshold value; and
   quadrature amplitude modulating a signal for transmission or demodulating a received signal in accordance with the adapted symbol constellation.

2. The method of claim 1, wherein the error correction coding rate is any one of 1/4, 1/3, 2/5, 1/2, 3/5, 2/3, 3/4, 4/5, 5/6, 8/9 and 9/10; and the symbol constellation has a size of m-QAM, where m is an integer greater than one.

3. The method of claim 1, wherein the threshold value is 8/9 for at least one of 256-QAM and 1024-QAM.

4. The method according to claim 1, wherein the adapting step comprises:
   receiving control information indicating whether to use a uniform symbol constellation or a non-uniform symbol constellation for the symbol constellation.

5. Apparatus comprising:
   a forward error correction encoder for providing encoded data having an associated error correction coding rate; and
   a quadrature amplitude modulator for adapting a symbol constellation as a function of the associated error correction coding rate to be either a non-uniform symbol constellation or a uniform symbol constellation and for modulating the encoded data in accordance with the adapted symbol constellation for transmission,
   wherein the quadrature amplitude modulator adapts the symbol constellation to be non-uniform if the associated error correction coding rate is greater than, or equal to, a threshold value, and otherwise adapts the symbol constellation to be uniform if the associated error correction coding rate is less than the threshold value.

6. The apparatus of claim 5, wherein the forward error correction encoder is a low density parity check encoder and wherein the associated error correction coding rate is any one of 1/4, 1/3, 2/5, 1/2, 3/5, 2/3, 3/4, 4/5, 5/6, 8/9 and 9/10; and the symbol constellation has a size of m-QAM, where m is an integer greater than one.

7. The apparatus according to claim 5, further comprising a processor for determining if the associated error correction coding rate is greater than, or equal to, the threshold value, and for controlling the adaption of the symbol constellation by the quadrature amplitude modulator.

8. Apparatus comprising:
   a quadrature amplitude demodulator for adapting a symbol constellation as a function of an associated error correction coding rate to be either a non-uniform symbol constellation or a uniform symbol constellation and for demodulating received data in accordance with the adapted symbol constellation for providing encoded data, wherein the quadrature amplitude demodulator adapts the symbol constellation to be non-uniform if the associated error correction coding rate is greater than, or equal to, a threshold value, and otherwise adapts the symbol constellation to be uniform if the associated error correction coding rate is less than the threshold value; and
   a forward error correction decoder for processing the encoded data encoded at the associated error correction coding rate and for providing decoded data.

9. The apparatus of claim 8, wherein the forward error correction decoder is a low density parity check decoder and wherein the associated error correction coding rate is any one of 1/4, 1/3, 2/5, 1/2, 3/5, 2/3, 3/4, 4/5, 5/6, 8/9 and 9/10; and the symbol constellation has a size of m-QAM, where m is an integer greater than one.

10. The apparatus according to claim 8, further comprising a processor for determining if the associated error correction coding rate is greater than, or equal to, the threshold value, and for controlling the adaption of the symbol constellation by the quadrature amplitude demodulator.

11. The apparatus according to claim 5, wherein the threshold value is associated with a selected QAM modulation scheme.

12. The apparatus of claim 11, wherein the threshold value is 8/9 for at least one of 256-QAM and 1024-QAM.

13. The method of claim 1, wherein the uniform symbol constellation includes a plurality of evenly spaced symbols and the non-uniform symbol constellation includes a plurality of unevenly spaced symbols.

14. The apparatus of claim 5, wherein the uniform symbol constellation includes a plurality of evenly spaced symbols and the non-uniform symbol constellation includes a plurality of unevenly spaced symbols.

15. The apparatus of claim 8, wherein the uniform symbol constellation includes a plurality of evenly spaced symbols and the non-uniform symbol constellation includes a plurality of unevenly spaced symbols.

* * * * *